United States Patent
Jabar, Jr. et al.

(10) Patent No.: US 9,458,570 B2
(45) Date of Patent: Oct. 4, 2016

(54) FILLER COMPOSITION AND METHOD OF PRODUCING COMPOSITE MATERIALS

(75) Inventors: Anthony Jabar, Jr., Waterville, ME (US); Michael A. Bilodeau, Brewer, ME (US); Mark A. Paradis, Old Town, ME (US)

(73) Assignees: Cerealus Holdings LLC, Waterville, ME (US); University of Maine System Board of Trustees, Bangor, ME (US)

( * ) Notice: Subject to any disclaimer, the term of this patent is extended or adjusted under 35 U.S.C. 154(b) by 0 days.

(21) Appl. No.: 13/823,100

(22) PCT Filed: Oct. 11, 2011

(86) PCT No.: PCT/US2011/055759
§ 371 (c)(1),
(2), (4) Date: Mar. 13, 2013

(87) PCT Pub. No.: WO2012/051175
PCT Pub. Date: Apr. 19, 2012

(65) Prior Publication Data
US 2013/0192778 A1    Aug. 1, 2013

Related U.S. Application Data

(60) Provisional application No. 61/393,373, filed on Oct. 15, 2010.

(51) Int. Cl.
| | |
|---|---|
| C04B 14/00 | (2006.01) |
| D21H 17/28 | (2006.01) |
| D21H 17/67 | (2006.01) |
| C09C 3/10 | (2006.01) |

(Continued)

(52) U.S. Cl.
CPC ............... *D21H 17/28* (2013.01); *C08L 3/02* (2013.01); *C08L 33/26* (2013.01); *C09C 1/021* (2013.01); *C09C 1/3676* (2013.01); *C09C 1/405* (2013.01); *C09C 1/42* (2013.01); *C09C 3/10* (2013.01); *D21H 17/67* (2013.01); *D21H 17/71* (2013.01); *D21H 17/74* (2013.01); *D21H 21/18* (2013.01); *C08L 2666/54* (2013.01); *D21H 17/69* (2013.01); *D21H 19/38* (2013.01); *Y02P 20/582* (2015.11)

(58) Field of Classification Search
None
See application file for complete search history.

(56) References Cited

U.S. PATENT DOCUMENTS 3,395,072 A * 7/1968 Talet et al. ................ 162/169
4,013,629 A   3/1977 Cummisford et al.

(Continued)

FOREIGN PATENT DOCUMENTS

WO    9813549    4/1998

OTHER PUBLICATIONS

International Search Report and Written Opinion in corresponding PCT application PCT/US2011/055759, Feb. 27, 2012, 8 pp.

(Continued)

*Primary Examiner* — Jun Li
*Assistant Examiner* — Ross J Christie
(74) *Attorney, Agent, or Firm* — Caseiro Burke LLC; Chris A. Caseiro (57) ABSTRACT

A modified filler composition for use in composites, such as paper and paper board, which is produced by reacting a filler material with a binder and a reactant material. Also, a method to produce composites, such as paper and paperboard, produced containing the modified filler composition is disclosed.

12 Claims, 3 Drawing Sheets

(51) Int. Cl.

| | |
|---|---|
| *C08L 3/02* | (2006.01) |
| *D21H 17/00* | (2006.01) |
| *D21H 21/18* | (2006.01) |
| *C09C 1/36* | (2006.01) |
| *C09C 1/40* | (2006.01) |
| *C09C 1/42* | (2006.01) |
| *C09C 1/02* | (2006.01) |
| *C08L 33/26* | (2006.01) |
| *D21H 17/69* | (2006.01) |
| *D21H 19/38* | (2006.01) |

(56) References Cited

U.S. PATENT DOCUMENTS

| | | | | |
|---|---|---|---|---|
| 4,089,691 | A * | 5/1978 | Cummisford et al. | 106/38.4 |
| 4,098,859 | A | 7/1978 | Cummisford et al. | |
| 4,158,574 | A * | 6/1979 | Cummisford et al. | 127/32 |
| 4,640,716 | A | 2/1987 | Cleland | |
| 5,227,024 | A * | 7/1993 | Gomez | 162/142 |
| 5,411,639 | A | 5/1995 | Kurrle | |
| 5,672,249 | A * | 9/1997 | Vinson et al. | 162/111 |
| 2008/0087396 | A1 | 4/2008 | Deng et al. | |
| 2008/0271865 | A1 * | 11/2008 | Soane | D21H 21/28 162/162 |
| 2009/0232887 | A1 * | 9/2009 | Odidi et al. | 424/457 |
| 2009/0318589 | A1 * | 12/2009 | Romero-Nochebuena | C04B 20/1011 524/4 |

OTHER PUBLICATIONS

First Office Action issued by the Chinese Patent Office (translated in English) for Chinese patent application No. 201180049708.0, dated Jul. 22, 2014, 9 pp.

Notice of Preliminary Rejection from the Korean Intellectual Property Office (translated in English) for Korean patent application No. 2013-7012384, dated Aug. 25, 2014, 3 pp.

First Office Action issued by the Eurasian Patent Office (translated in English) for Eurasian patent application No. 201300462/28, dated Oct. 31, 2014, 1 pp.

First Office Action issued by the European Patent Office for European patent application No. 11833246.9, dated Jul. 6, 2015, 5 pp.

* cited by examiner

Figure 1

FILLER COMPOSITION AND METHOD OF PRODUCING COMPOSITE MATERIALS

CROSS REFERENCE TO RELATED APPLICATION

This application is a nonprovisional application, and claims the priority benefit, of provisional U.S. patent application Ser. No. 61/393,373, filed Oct. 15, 2010, of the same named inventors. The entire content of that priority application is incorporated herein by reference.

BACKGROUND OF THE INVENTION

1. Field of the Invention

The present invention relates to compositions of matter. In particular, the present invention relates to filler materials combined with other materials to form compositions. Still more particularly, the present invention relates to filler-based compositions and methods of making such materials for use in the papermaking industry but not limited thereto.

2. Description of the Prior Art

Fillers or pigments are often incorporated into composites, such as paper, paper board or plastics, to improve physical or optical properties and/or to lower the costs of the material. Fillers, and more specifically inorganic pigments, are often added to paper composites to improve surface smoothness, print quality, opacity and brightness and to replace more expensive fiber thereby lowering the cost to manufacture such products. However, it is well known that fillers also reduce the strength of paper and are difficult to retain in the web forming process due to their small physical size relative to common paper making fibers. These limitations often constrain the amount of filler that can be incorporated in paper formulations.

There has been significant effort to produce fillers that impart the desired optical properties in paper and paperboard while minimizing the loss in strength of the paper or paperboard thus produced. One method has been described that involves the manufacture of modified fillers for use in a papermaking process, and modified fillers and paper produced therewith. The method includes making a modified filler by applying starch to a reaction mixture comprising at least one of fatty acid, rosin acid, or ammonium sulfate, and applying a filler to the reaction mixture, thereby forming a modified filler.

Another method provides for the production of filler-containing papers and filler-containing paper products by addition of an aqueous suspension of at least one finely divided polymer-pigment hybrid to a paper stock and drainage of the paper stock to form a sheet of paper. The polymer-pigment hybrid is obtained by milling an aqueous suspension of at least one inorganic pigment in the presence of at least one binder and, if appropriate, by drying the aqueous suspension thus obtainable and re-dispersing the dried polymer-pigment hybrid in water. It is understood that the polymer-pigment hybrids may be used as fillers for the production of filler-containing paper or filler-containing paper products.

While these examples illustrate that modified fillers have been considered for use in papermaking, there is an ongoing need for fillers that can be utilized to produce filled papers and other types of end products, which have optical properties desired for such products while maintaining suitable strength characteristics at an economically viable cost. To date, fillers that have been used in paper and other products generate strength loss and other characteristic retention deficiencies that are simply unsatisfactory and, as a result, fillers and filler-based compositions that may otherwise generate cost savings cannot be implemented in a meaningful way.

What is needed is a filler material or filler-based composition for use in combination with a primary structural material that does not diminish desired optical, physical and processing characteristics of the primary material to a level that makes the end product containing that primary material inadequate for its intended purpose. What is also needed is such a filler material and/or filler-based composition that reduces the overall cost of the end product or that at least does not add to it.

SUMMARY OF THE INVENTION

It is an object of the present invention to provide a modified filler composition for use in combination with a primary structural material that does not diminish desired optical, physical and processing characteristics of the primary material to a level that makes the end product containing that primary material inadequate for its intended purpose. It is also an object of the invention to provide such a modified filler composition that reduces the overall cost of the end product or that at least does not add to it. Further, it is an object of the present invention to provide one or more methods for making such a modified filler composition. Yet further, it is an object of the invention to provide one or more applications for use of the modified filler composition.

These and other objects of the present invention are achieved by the formation of a modified filler composition that may be used for paper products, other forms of cellulose-based products and other products for which a filler material is desirable, one that does not significantly diminish desired characteristics of products containing it, that reduces the cost associated with such products and/or that may be incorporated into existing product-making processes. The modified filler composition is configured to be a viable component of the product. It includes the combination of a selected filler material with a binder and a reactant material and possibly one or more other components having desired characteristics. For example, for a paper-based product, the filler may be fiber and the binder may be starch. The reactant material modifies the filler material sufficiently to allow for its effective combination with the binder, a primary structural material and/or with the one or more other components. As a result, more of the filler material may be used with the primary structural material without causing an unsuitable decline in desired characteristics of the primary structural material including, but not limited to, strength of the end product. The invention includes the establishment of a set of processing steps to produce the modified filler composition, composites and end products including the modified filler compositions and/or composites including the modified filler composition.

The use of the modified filler composition of the present invention enables the manufacture of viable end products at reduced cost. These and other advantages of the present invention will become more apparent upon review of the following detailed description, the accompany drawings and the appended claims.

DETAILED DESCRIPTION OF THE INVENTION

The present invention is a modified filler composition containing a filler, a binder and a reactant. The three components are preferably less costly than a primary structural material component that they would be used to replace. The composition enables the formation of modified filler particles that can be added directly to other components to make modified composite materials. One example of such a modified composite material is a fiber slurry that forms the basis of paper and paperboard products.

The binder is chosen from materials known to bind with one or more of the individual components of a desired modified composite material. One example of a major individual component of interest for binding purposes may be a primary structural material of an end product. For the case of paper and paperboard as the end product, the major component is generally cellulose fiber. Suitable binders for cellulose-based products include, but are not limited to, native and modified starches, gums, latex or derivatized cellulose products. Starches can be isolated from corn, waxy maize, potato, tapioca, wheat, or rice. The starch may further be modified into oxidized, cationic, anionic, acid-thinned, ethylated and aldehyde starches.

The filler is any material considered suitable as a filler to supplement a primary structural material. The filler is preferably provided in particle form but not limited thereto. It is chosen from materials including, but not limited to, fiber, ground calcium carbonate, precipitated calcium carbonate, Kaolin clay, calcined clay, water-washed clay, titanium dioxide, mica, talc, uncooked starch granules, dried distiller grains, rice hulls, crushed nutshells, oat bran, or similar materials and blends thereof. If a fiber is selected as the filler material it may be any one or more of any cellulosic fiber, any pulp including mechanical, chemical or recycled pulp.

The reactant is any material suitable for chemically joining the binder and the filler material together and selected to be sufficiently compatible with the primary structural material and other materials of the end product so as to minimize negative impact on the desired characteristics of the end product including such components. In particular, the reactant is selected to react with the binder material to encapsulate the filler material so that it reduces any adverse impact that the filler may have on the primary structural material of the end product including, for example, fibers of paper-based products. Prior to the present invention, filler materials have had a tendency to interrupt the process of fibers and structural materials linking together. The reactant of the present invention acts to encapsulate or isolate the filler so that it will not cause such a disruption. The reactant is chosen from materials including, but not limited to, aldehydes, dialdehydes (including, without limitation, ethanedial, also referred to as glyoxal, including blocked and straight or unblocked glyoxal-based insolubilizers), aliphatic epoxy resins, melamine formaldehyde resins, ammonium zirconium carbonates, potassium zirconium carbonate, blocked isocyanates and mixtures thereof.

The process of making the modified filler composition of the present invention includes heating the binder to a temperature in the range of about 140° F. to about 320° F. The binder may be heated in a batch cooker or in a continuous jet cooker, in the case of the binder being a starch or other polysaccharide. The binder is combined with the filler particles before, during or after heating the binder to a temperature of about 180° F. The binder and filler are combined together at a range of ratios from a relatively high end ratio of about 300 parts of binder to about one part of filler to a relatively low end ratio of about 0.05 parts of binder to about one part of filler, the ratios being expressed on a dry weight basis.

In the next step of the process, the reactant is then added to the binder and filler combination and the three components are mixed together at a selectable temperature in the range of about 120° F. to about 330° F. The binder-filler combination and the reactant are combined together at a range of ratios from a relatively high end ratio of about nine parts of reactant to about 100 parts of binder to a relatively low end ratio of about 0.05 parts of reactant to about 100 parts of binder, the ratios being expressed on a dry weight basis. The dispersion of binder, filler and reactant is then mixed until a reaction has been sufficiently completed. What constitutes a sufficiently completed reaction of the combination of three components is dependent upon the particular materials chosen for each component and the selected mixing temperature. For example and in no way limiting, if the three components are cellulose fiber, starch and glyoxal combined and mixed at a temperature of about 180° F., the reaction is sufficiently complete in about one minute. The characteristics of the modified filler composition that identify it as being a sufficiently complete reaction include that the filler is sufficiently encapsulated or trapped by the binder. The reaction is considered complete if less than 10% by weight of the binder is present in the filtrate after passing a dilute (less than 2% solids) slurry of the composition through a standard filter paper (for example Whatman #4 filter paper). In that context, when the composition is gelled or almost gelled, the reaction should be sufficiently complete to ensure that the filler is suitably encapsulated and ready for combining with additional components to form an end product.

Five examples of the composition of the present invention were prepared and used in the fabrication of paper products. The fabricated paper products were tested in comparison to similarly fabricated paper products wherein the similarly fabricated paper products did not include the modified filler composition of the present invention. The test results indicated that the modified filler composition was an effective component of the fabricated product and enabled the use of a reduced amount of the primary structural component of the product without a significant reduction in properties of interest, including physical and optical properties. The examples and corresponding test results are described herein.

Example I

In a first example of the invention, a dispersion of cooked pearl corn starch and a dispersion of ground calcium carbonate are added together in a container at an equal dry weight basis. The combination dispersion is adjusted to about 20% total solids content by adding water to the container at a volume ratio of about four parts water to about one part of the two-component dispersion mixture. The liquid mixture is heated to a temperature of about 140° F. Glyoxal reactant, such as Glyoxal 40% solids available from BASF, at a concentration of about three parts of the reactant to about 100 parts of starch on a dry weight basis is added to the container and mixed periodically for about three hours while substantially maintaining the temperature at about 140° F.

The resulting modified filler composition was combined with a primary structural material, cellulose fiber in the case of a paper product, and evaluated. It was observed to demonstrate improved bonding characteristics and a more easily retained particle size distribution with respect to the fiber material. It was also observed that the modified filler composition that was made could be used as a slurry, or optionally dried and provided as a dry filler material used in the processing of additional components, including cellulose fibers, in a later redispersion, to produce paper or paperboard composites. That is, the modified filler composition of the present invention may be provided in a liquefied form for introduction into a product making process at one stage of the process, or it may be provided in a dried particulate form for introduction at a different stage of the product making process. For example, the modified filler composition may be added at the wet end of a paper making process either in wet or dry form. In this form of its usage, the modified filler composition may be used to manufacture composites whereby the modified filler composition is dispersed with other components and manufactured into a composite. Alternatively, it may be used as a component of a coating and that modified coating may be applied to the surface of a composite or substrate.

The strength of a composite product can be increased with the use of the modified filler composition if used as a replacement for an existing conventional filler. The example embodiment described above was used in the process of making a paper product using a standard handsheet mold in accordance with the Technical Association of Pulp and Paper Industry (TAPPI) standard method T-205 and tested for strength properties in accordance with TAPPI standard test methods T-569 "Internal bond strength (Scott type) of paper" and T-404 "Tensile breaking strength and elongation of paper". Paper to be tested was made using the conventional filler, ground calcium carbonate, such as the Omyafil® calcium carbonate product available from the Omya company of Proctor, Vt., and the modified filler composition described above. The convention filler was incorporated with cellulose fiber and other standard components of the paper product at ratios of about 10%, about 20% and about 30% by weight of the total paper product weight. Even more of the modified filler composition of the present invention was incorporated with the cellulose fiber and other standard components of the paper product at ratios of about 12.5%, about 22.5% and about 32.5% by weight of the total paper weight. It would have been expected with a conventional filler that the addition of more filler would have lowered the tensile strength of the paper more.

Figure 1:
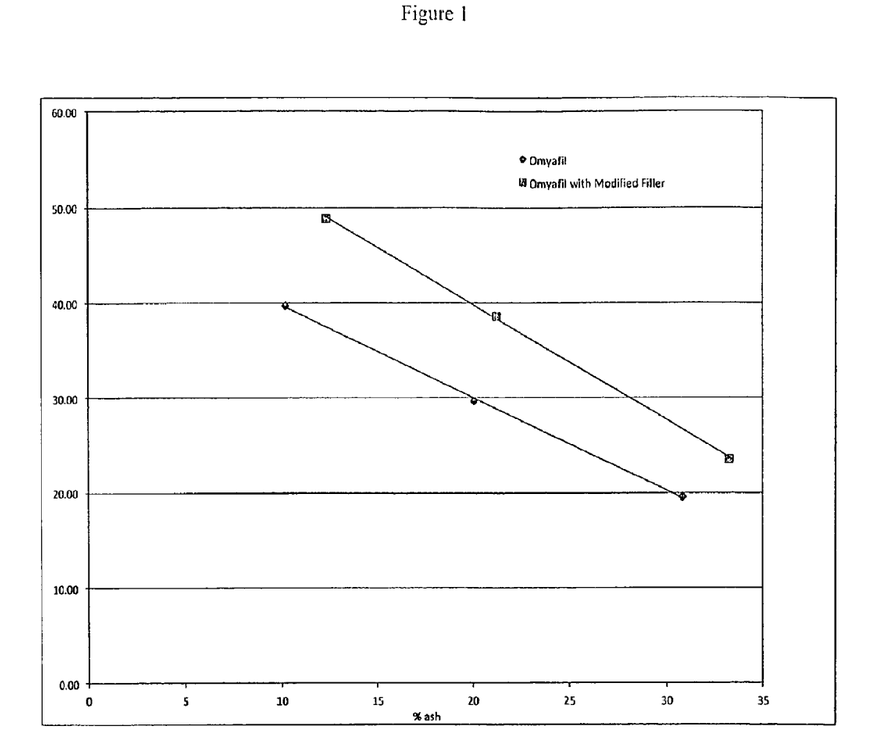
FIG. 1 is a graph showing the gain in tensile strength of a paper product provided by inclusion of the modified filler for a first example of the present invention in which the weight content of filler in the paper product is referred to as ash, the ash being either the conventional filler Omyafil® calcium carbonate or the modified filler of the present invention including the Omyafil® product.

As illustrated in FIG. 1, in which the filler content is referred to as the "ash" content, the tensile strength of the paper with the modified filler composition of the present invention is significantly greater than the tensile strength of the paper with the conventional filler. Specifically, paper with 12.5% modified filler composition is about 20% stronger than paper with only 10% conventional filler, paper with 22.5% modified filler composition is about 25% stronger than paper with only 20% conventional filler, and paper with 32.5% modified filler composition is about 20% stronger than paper with only 30% conventional filler. These results clearly show that at least a cellulose-based end product may be made with more of a filler that is less expensive than one or more other components of the end product it may be used to replace without diminishing, and actually improving, the strength of that end product.

Example II

In a second example of the modified filler composition of the present invention, a sample of commercial recycled fiber (Printing and Writing grade of recycled fiber manufactured by Fibrek, Inc. of Montreal, Quebec, Canada) was made into handsheets according to the TAPPI standard method T-205 and tested for strength properties in accordance with TAPPI standard test methods T-569 "Internal bond strength (Scott type) of paper" and T-404 "Tensile breaking strength and elongation of paper". These papers are identified as "Control" in Table 1. A second set of handsheets was similarly prepared and tested with the addition of 10% treated recycled fiber. Three versions of treated recycled fiber were prepared, each including a different reactant of the modified filler composition of the present invention. The treated fibers were prepared by cooking unmodified corn starch at 10% solids at 190° F. for 30 minutes and then adding an equal amount, on a dry basis, of the untreated recycled fiber to the cooked starch paste. 3% of a reactant (dry basis based on starch solids) was added to the slurry under vigorous agitation. This treated fiber slurry was then added to a sample of untreated recycled fiber at 10% loading, on a dry solids basis. The results of the testing are presented in Table 1 for strength additive compositions containing three different reactants. The three different reactants used in making the different treated recycled fiber handsheets were: A—the Glyoxal 40% solids used in the formation of the modified filler composition of Example I; B—Ammonium zirconium carbonate in the form provided under the trade name Bacote 20 available from Mel Chemicals, Inc., of Flemington, N.J.); and C—Potassium zirconium carbonate in the form provided under the trade name Zirmel 1000, also available from Mel Chemicals, Inc. As can be seen from Table 1, all treated fiber conditions show a significant improvement in tensile and Scott bond strength compared to the Control.

TABLE 1

Paper Strength Improvement - Recycled Fiber

| Condition | Reactant | Tensile Index Nm/g | Scott bond ft lbs/1000 in$^2$ |
|---|---|---|---|
| Control - Untreated Recycled Fiber | None | 29.6 | 80 |
| 90% Untreated 10% treated Recycled fiber | A | 40.0 | 164 |
| 90% Untreated 10% treated Recycled fiber | B | 39.2 | 128 |
| 90% Untreated 10% treated Recycled fiber | C | 36.5 | 113 |

Example III

In a third example of the modified filler composition of the present invention, a sample of commercial Northern Bleached Softwood Kraft (NBSK) pulp (St. Felicien NBSK pulp manufactured by Fibrek, Inc. of Montreal, Quebec, Canada) was made into handsheets in accordance with the TAPPI standard method T-205 and tested for strength properties in accordance with TAPPI standard test methods T-569 "Internal bond strength (Scott type) of paper" and T-404 "Tensile breaking strength and elongation of paper". These papers are identified as "Control" in Table 2. A second set of handsheets in three different versions was similarly prepared and tested. The first version was formed of 95% untreated NBSK and 5% NBSK treated with a form of the modified filler composition of the present invention. The second version was 90% untreated NBSK and 10% NBSK treated with the same form of the modified filler composition. The third version was 80% NBSK and 20% NBSK treated with the same form of the modified filler composition. The treated NBSK fibers were prepared by cooking unmodified corn starch at 10% solids at 190° F. for 30 minutes and then adding an equal amount, on a dry basis, of the untreated NBSK fiber to the cooked starch paste. 3% of a reactant (dry basis based on starch solids) was added to the slurry under vigorous agitation. The reactant in this example was the same Glyoxal 40% used in Example I. This treated fiber slurry was then added to a sample of untreated NBSK fiber at a 5%, 10% and 20% loading, on a dry solids basis. The results of the testing are presented in Table 2. All treated fiber conditions show a significant improvement in tensile and Scott bond strength compared to the Control.

TABLE 2

Paper Strength Improvement - NBSK

| Condition | Tensile Index Nm/g | Scott bond ft lbs/1000 in$^2$ |
|---|---|---|
| Control - Untreated NBSK pulp | 21.8 | 40 |
| 95% Untreated 5% treated NBSK pulp | 30.0 | 57 |
| 90% Untreated 10% treated NBSK pulp | 31.5 | 59 |
| 80% Untreated 20% treated NBSK pulp | 44.5 | 121 |

Example IV

In a fourth example of the modified filler composition of the present invention, a fiber slurry comprising a blend of 25 wt % NBSK pulp, 45 wt % groundwood and 30 wt % thermo-mechanical pulp was prepared and various amounts of Kaolin clay (both untreated and treated using the modified filler composition of the present invention) and conventional processing aids were added to the fiber slurry prior to forming into handsheets in accordance with the TAPPI standard method T-205. The following process aids were added to each aliquot of slurry prior to forming the handsheets (Table 3).

TABLE 3

Processing aids added to all handsheets

| Material | Lb/ton of paper, dry basis |
|---|---|
| Cationic starch | 10 |
| Anionic polyacrylamide | 0.5 |
| Cationic coagulant | 6 |
| Colloidal silica | 0.75 |

Untreated Kaolin clay was added to the fiber slurry at a rate of 100, 200 and 400 lb/ton of paper and sets of handsheets were produced from the resulting mixture.

Figure 2:
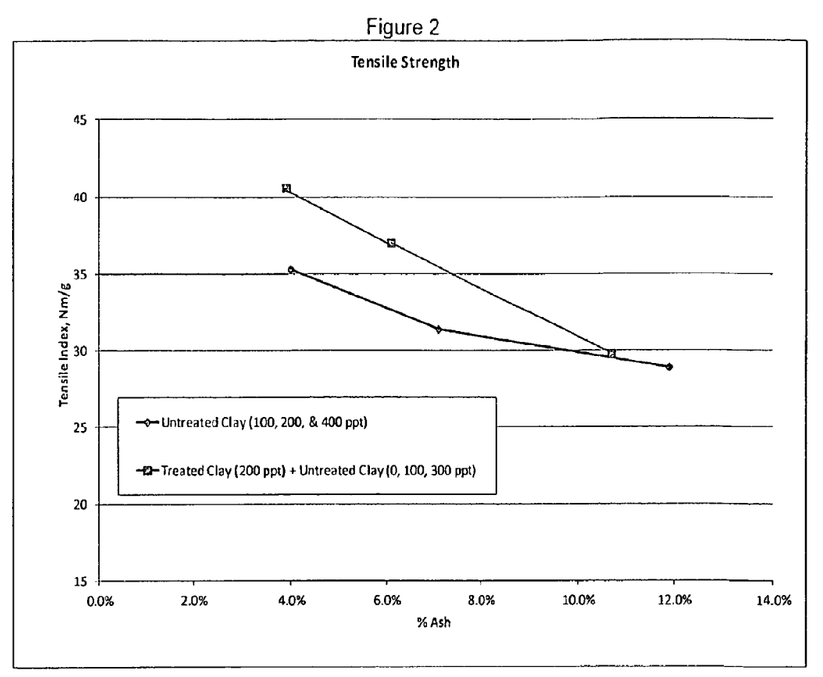
FIG. 2 is a graph showing the gain in tensile strength of a paper product provided by inclusion of the modified filler for a fourth example of the present invention in which the weight content of filler in the paper product is referred to as ash, the ash being either the conventional filler Kaolin clay or the modified filler of the present invention including the Kaolin clay product.
Figure 3:
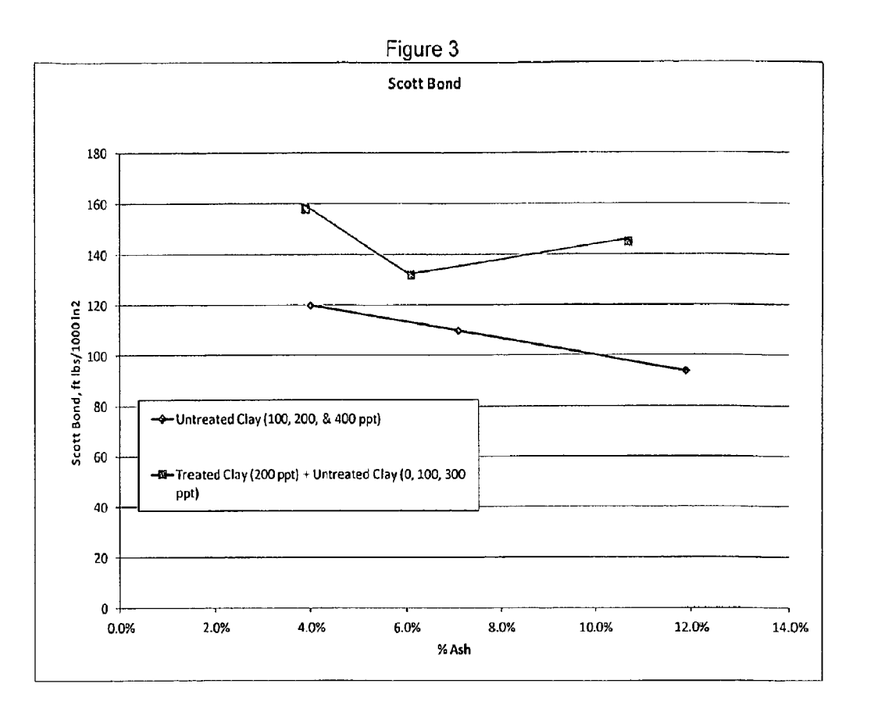
FIG. 3 is a graph showing the gain in bond strength of the paper product of the fourth example of the present invention.

Treated filler was prepared by cooking unmodified corn starch at 10% solids at 190° F. for 30 minutes and then adding an equal amount, on a dry basis, of untreated kaolin clay to the cooked starch paste. 3% (dry basis based on starch solids) of the Glyoxal 40% reactant was then added to the mixture under vigorous agitation. The treated filler was added to the fiber slurry at a rate of 200 lb/ton of paper along with untreated Kaolin clay at 0, 100 and 300 lb/ton of paper in three different versions of the example product. The sets of handsheets were produced from the resulting mixtures. Each set of handsheets was tested for strength properties in accordance with TAPPI standard test methods T-569 "Internal bond strength (Scott type) of paper", T-404 "Tensile breaking strength and elongation of paper" and T-211 "Ash content of paper—combustion at 525 C". The results are presented in Table 4 and FIGS. 2 and 3, in which all treated filler compositions show a significant improvement in tensile and Scott bond strength compared to the untreated filler versions of the product.

TABLE 4

Paper Strength Improvement - Kaolin clay filler

| Condition | Tensile Index Nm/g | Scott bond ft lbs/1000 in$^2$ | Ash content % ash |
|---|---|---|---|
| Untreated Kaolin clay, 100 lb/ton | 35.3 | 120 | 4.0% |
| Untreated Kaolin clay, 200 lb/ton | 31.4 | 110 | 7.1% |
| Untreated Kaolin clay, 400 lb/ton | 28.9 | 94 | 11.9% |
| Treated Kaolin clay, 200 lb/ton + Untreated Kaolin clay, 0 lb/ton | 40.6 | 158 | 3.9% |
| Treated Kaolin clay, 200 lb/ton + Untreated Kaolin clay, 100 lb/ton | 37.0 | 132 | 6.1% |
| Treated Kaolin clay, 200 lb/ton + Untreated Kaolin clay, 300 lb/ton | 29.8 | 145 | 10.7% |

Example V

In a fifth example of the modified filler composition of the present invention, a fiber slurry comprising a blend of 30 wt % NBSK pulp and 70 wt % northern bleached hardwood kraft pulp was used to produce an uncoated paper with a nominal basis weight of 75 gm (+/−6 gm) using a pilot paper machine at the University of Maine in Orono, Me. The ground calcium carbonate (GCC) pigment Omyafil® was added to the paper making stock to adjust the filler content from about 10% to 17% by weight. These papers are identified as Conditions A, B and C in Tables 5 and 6. The following paper making additives were added to the furnish to aid in the production of the paper; (1) a cooked cationic starch (Sta-Lok 160 available from Tate & Lyle of Decatur, Ill.), (2) a cationic coagulant (Nalco 7607 available from Nalco Chemical Co. of Naperville, Ill.), (3) a retention aid (Telioform available from BASF) and (4) a drainage aid (Bentonite, also available from BASF). A summary of the additives and dosages are given in Table 5.

TABLE 5

Paper Making Additives

| | Additive | | | | | |
|---|---|---|---|---|---|---|
| | GCC | Treated GCC | Cationic Starch | Cationic Co-agulant | Retention Aid | Drainage Aid |
| | lb/ton of paper, dry basis | | | | | |
| Condition A | 200 | 0 | 15 | 1 | 1 | 3 |
| Condition B | 300 | 0 | 15 | 1 | 1 | 3 |
| Condition C | 400 | 0 | 15 | 1 | 1 | 3 |
| Condition D | 200 | 60 | 15 | 1 | 1 | 3 |
| Condition E | 200 | 200 | 0 | 1.5 | 1 | 6 |
| Condition F | 200 | 300 | 0 | 0.5 | 1 | 6 |

Note:
Treated filler was added as a coating using a size press coater to both sides of the paper in Condition D.

The GCC pigment was also modified in accordance with the present invention to create a modified filler composition. Three versions of example paper products were made incorporating the treated GCC filler and referred to herein as paper Conditions D, E and F as shown in Table 5. The treated filler used in Condition D paper was prepared by cooking ethylated corn starch (Ethylex 2026 available from Tate & Lyle) at approximately 10% solids at 190° F. for 30 minutes and then adding an equal amount, on a dry basis, of untreated GCC to the cooked starch paste. 2 wt % (on a dry basis based on starch solids) of the reactant Glyoxal 40% was then added to the mixture under vigorous agitation. The treated filler slurry was added to the surfaces of a paper web (at a 3 wt %, or 60 lb/ton, add-on) as a coating using a conventional size press coater.

The treated filler used in Condition E paper was prepared by cooking a blend of 30% of the cationic corn starch Sta-Lok 160 and 70% unmodified corn starch, such as the Pearl Corn Starch available from Tate & Lyle, at approximately 10% solids at 190° F. for 30 minutes and then adding an equal amount, on a dry basis, of untreated GCC to the cooked starch paste. 2 wt % (on a dry basis based on starch solids) of the reactant Glyoxal 40% was then added to the mixture under vigorous agitation. The treated filler slurry was then added to the fiber slurry at a dosage of 200 lb/ton of paper prior to forming the slurry into a paper web.

The treated filler used in Condition F was prepared by cooking a blend of the 30% cationic corn starch Sta-Lok 160 and 70% unmodified potato starch identified by the trade name Potato Starch available from Aroostook Starch of Ft. Fairfield, Me., at approximately 10% solids at 190° F. for 30 minutes and then adding 1.5 times untreated GCC, on a dry basis, to the cooked starch paste. 2 wt % (on a dry basis based on starch solids) of the reactant Glyoxal 40% was then added to the mixture under vigorous agitation. The treated filler slurry was then added to the fiber slurry at a dosage of 300 lb/ton of paper prior to forming the slurry into a paper web.

Samples of paper from each Condition were tested for strength properties in accordance with TAPPI standard test methods T-569 "Internal bond strength (Scott type) of paper", T-404 "Tensile breaking strength and elongation of paper" and T-211 "Ash content of paper—combustion at 525 C". The results are presented in Table 6. All treated filler paper products (Conditions D, E and F) show a significant improvement in strength, as measured by Tensile strength and Scott bond strength compared to the untreated filler paper products (Conditions A, B and C).

TABLE 6

Paper Strength Improvement - Calcium Carbonate Filler

| | Tensile Index | | | Ash |
|---|---|---|---|---|
| | MD | CD | Scott Bond | content |
| | Nm/g | | ft lbs/1000 in$^2$ | % ash |
| Condition A Untreated GCC 200 lb/ton | 59.4 | 25.5 | 146 | 10.9% |
| Condition B Untreated GCC 300 lb/ton | 53.9 | 23.8 | 134 | 14.4% |
| Condition C Untreated GCC 400 lb/ton | 49.2 | 22.4 | 125 | 17.8% |
| Condition D Untreated GCC 200 lb/ton + Treated GCC 60 lb/ton as a coating | 74.6 | 28.9 | 234 | 12.6% |
| Condition E Untreated GCC 200 lb/ton + Treated GCC 200 lb/ton | 70.4 | 31.5 | 252 | 13.7% |
| Condition F Untreated GCC 200 lb/ton + Treated GCC 300 lb/ton | 83.3 | 34.7 | 397 | 15.3% |

The modified filler composition of the present invention may be provided as a finished product wherein the steps to make it as described above have been completed prior to transfer for use in the manufacture of an end product. Optionally, the three primary components of the filler material, the binder material and the reactant material may be provided as separate components and instructions provided to perform the steps described herein to make the modified filler composition. Further, the filler material and the binder material may be combined together to form the filler-binder composition described herein prior to addition of the reactant material and instructions provided to complete the steps of joining the reactant material and the filler-binder composition to form the modified filler composition.

The modified filler composition may be combined with additional components used to form a desired end product, such as a paper product, as part of the process of making that end product. Alternatively, the modified filler composition may be combined with one or more other components to form a coating. That coating may then be applied to an end product, such as a paper product, that has already been manufactured. For example but in no way intending to be limiting, the modified filler composition may be incorporated into, or it may be, a coating product used in a size press coating application.

The modified filler composition of the present invention may further be used in combination with other materials to enhance the effectiveness of such other materials in the improvement of characteristics of other products. For example, the modified filler composition may be used in combination with the materials described in U.S. Pat. Nos. 5,928,474, 5,859,128, 6,699,363, 6,048,929, the entire contents of which are incorporated herein by reference, to produce one or more cellulose-based products having improved characteristics.

While this invention has been described with respect to several example embodiments of the modified filler composition, methods of making such compositions and applications for the use of such compositions, it will be apparent to those of skill in the art that alternatives, modifications and variations may be created without deviating from the invention as expressly described. Accordingly, the preferred embodiments of the invention as set forth above are intended to be illustrative, not limiting. Various changes may be made without departing from the spirit and scope of the invention.

What is claimed is:

1. A modified filler composition to be added to a mixture for use in the manufacture of one or more end products, the composition consisting essentially of:
   a. a reactant material;
   b. a binder material; and
   c. a filler material encapsulated in a combination of the reactant material and the binder material,
   wherein less than 10% by weight of the binder material is present in a filtrate after passing a dilute slurry of the composition through a standard filter paper, and wherein the weight ratio of binder material to filler material is about one to one.

2. The composition of claim 1, wherein a weight ratio of reactant material to binder material is in a range of about nine parts of reactant to about 100 parts of binder material to about 0.05 part of reactant to about 100 parts of binder material.

3. The composition of claim 1, wherein a weight ratio of reactant material to binder material is in a range of about nine parts of reactant to about 100 parts of binder material to about 0.05 part of reactant to about 100 parts of binder.

4. The composition of claim 1, further comprising water, wherein water comprises about 80% of the composition.

5. The composition of claim 1, wherein:
   a. the filler material is selected from the group consisting of fiber, ground calcium carbonate, precipitated calcium carbonate, Kaolin clay, calcined clay, water-washed clay, titanium dioxide, mica, talc, uncooked starch granules, dried distiller grains, rice hulls, crushed nutshells, and oat bran;
   b. the binder material is selected from the group consisting of native and modified starches, gums, latex or derivatized cellulose products, wherein the native and modified starches are selected from the group consisting of starches isolated from corn, waxy maize, potato, tapioca, wheat, or rice and starches modified into oxidized, cationic, anionic, acid-thinned, ethylated and aldehyde starches; and
   c. the reactant material is selected from the group consisting of glyoxals, blocked and straight or unblocked glyoxal-based insolubilizers, aliphatic epoxy resins, melamine formaldehyde resins, ammonium zirconium carbonates, potassium zirconium carbonate, blocked isocyanates and mixtures thereof.

6. The composition of claim 5, wherein the filler material is cellulose fiber, the binder material is starch and the reactant is glyoxal.

7. A modified filler composition to be added to a mixture for use in the manufacture of one or more end products, the composition consisting essentially of:
   a. a reactant material;
   b. a binder material; and
   c. a filler material encapsulated in a combination of the reactant material and the binder material,
   wherein the weight ratio of binder material to filler material is about one to one.

8. The composition of claim 7, wherein a weight ratio of reactant material to binder material is in a range of about nine parts of reactant to about 100 parts of binder material to about 0.05 part of reactant to about 100 parts of binder material.

9. The composition of claim 7, wherein a weight ratio of reactant material to binder material is in a range of about nine parts of reactant to about 100 parts of binder material to about 0.05 part of reactant to about 100 parts of binder.

10. The composition of claim 7, further comprising water, wherein water comprises about 80% of the composition.

11. The composition of claim 7, wherein:
    a. the filler material is selected from the group consisting of fiber, ground calcium carbonate, precipitated calcium carbonate, Kaolin clay, calcined clay, water-washed clay, titanium dioxide, mica, talc, uncooked starch granules, dried distiller grains, rice hulls, crushed nutshells, and oat bran;
    b. the binder material is selected from the group consisting of native and modified starches, gums, latex or derivatized cellulose products, wherein the native and modified starches are selected from the group consisting of starches isolated from corn, waxy maize, potato, tapioca, wheat, or rice and starches modified into oxidized, cationic, anionic, acid-thinned, ethylated and aldehyde starches; and
    c. the reactant material is selected from the group consisting of glyoxals, blocked and straight or unblocked glyoxal-based insolubilizers, aliphatic epoxy resins, melamine formaldehyde resins, ammonium zirconium carbonates, potassium zirconium carbonate, blocked isocyanates and mixtures thereof.

12. The composition of claim 11, wherein the filler material is cellulose fiber, the binder material is starch and the reactant is glyoxal.

* * * * *